Figure 7:
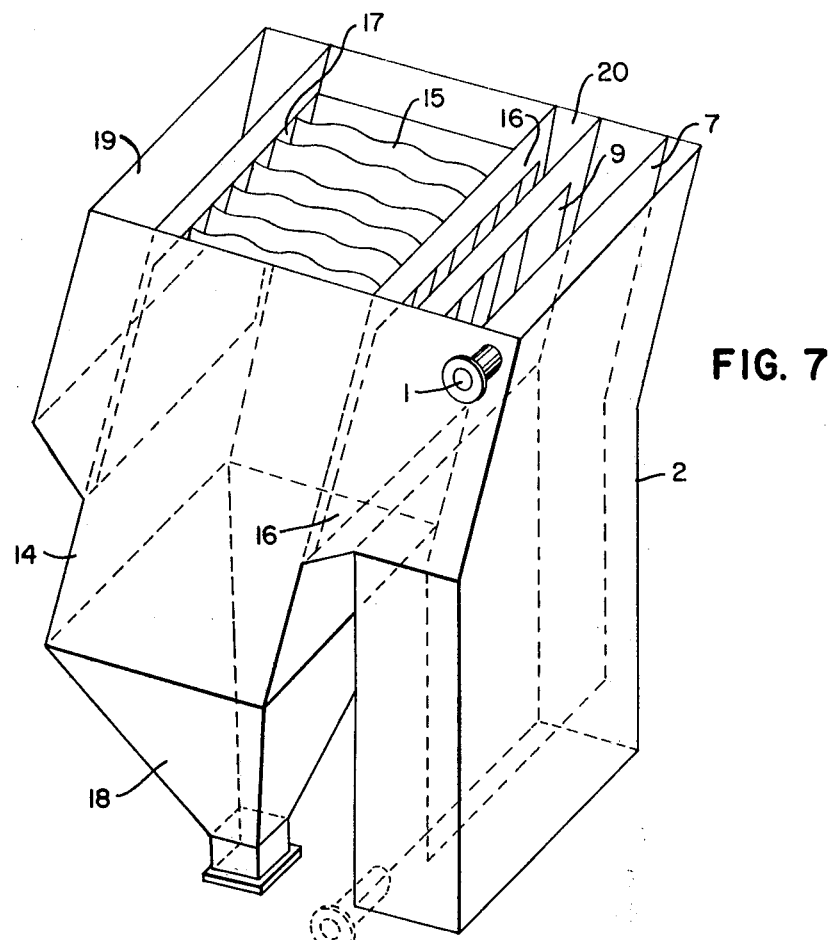

United States Patent [19]

Pielkenrood

[11] 4,133,771

[45] * Jan. 9, 1979

[54] APPARATUS FOR BRINGING ABOUT PARTICLE GROWTH IN A FLOWING LIQUID SUSPENSION

[75] Inventor: Jacob Pielkenrood, Krommenie, Netherlands

[73] Assignee: Pielkenrood-Vinitex B.V., Assendelft, Netherlands

[*] Notice: The portion of the term of this patent subsequent to Aug. 3, 1993, has been disclaimed.

[21] Appl. No.: 667,962

[22] Filed: Mar. 18, 1976

Related U.S. Application Data

[63] Continuation of Ser. No. 559,132, Mar. 17, 1975, abandoned, which is a continuation of Ser. No. 353,543, Apr. 23, 1973, abandoned.

[51] Int. Cl.$^2$ .............................................. B01D 21/00
[52] U.S. Cl. ....................................... 210/513; 210/521
[58] Field of Search .................... 210/49, 83, 84, 207, 210/259, 513, 521, 522, 536, 538; 162/327

[56] References Cited

U.S. PATENT DOCUMENTS

| 367,308 | 7/1887 | Macnab et al. ...................... 210/521 |
| 386,114 | 7/1888 | Donahue ................................ 210/522 |
| 1,457,285 | 10/1920 | Shaw ...................................... 162/324 |
| 1,864,511 | 6/1932 | Jones .................................. 210/522 X |
| 1,897,240 | 2/1933 | Dahlgren ............................... 210/522 |
| 2,127,698 | 8/1938 | Niks .................................. 162/327 X |
| 2,153,607 | 4/1939 | Bach ...................................... 210/522 |
| 2,190,596 | 2/1940 | Dorr ........................................ 210/49 |
| 2,200,002 | 5/1940 | Lane et al. ......................... 162/329 X |
| 2,207,399 | 7/1940 | Gaertner ................................. 210/84 |
| 2,233,218 | 2/1941 | Moore ................................. 210/49 X |
| 2,264,139 | 11/1941 | Montgomery et al. ......... 210/521 X |
| 2,413,375 | 12/1946 | Pomeroy ................................. 210/49 |
| 3,161,590 | 12/1964 | Weis et al. ....................... 210/521 X |
| 3,972,819 | 8/1976 | Pielkenrood .......................... 210/513 |

FOREIGN PATENT DOCUMENTS

1164221 5/1958 Fed. Rep. of Germany ........... 162/327
19560 of 1894 United Kingdom ..................... 210/513

OTHER PUBLICATIONS

"The Paper Industry", Dec., 1950, Williamson, pp. 967–969.

Primary Examiner—Theodore A. Granger
Attorney, Agent, or Firm—Smyth, Pavitt, Siegemund, Jones & Martella

[57] ABSTRACT

Apparatus for causing coalescence of particles of solid or liquid matter suspended in a carrier liquid which moves in a continuous flow, by generating in said liquid flow velocity gradients so that particles in adjacent flow layers having a small velocity difference can overtake one another and can, thus, coalesce to larger particles, the velocity gradients being controlled in such a manner that the coalescence is not annihilated by shearing forces between adjacent layers, and the liquid flow rate being controlled in such a manner that separation of the coalesced particles will not take place in the device itself.

9 Claims, 11 Drawing Figures

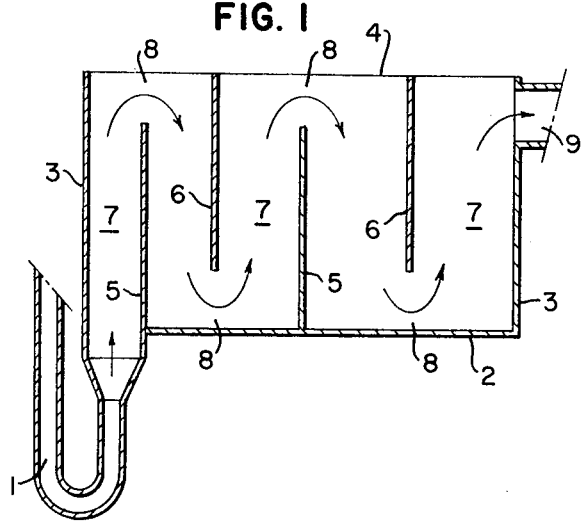
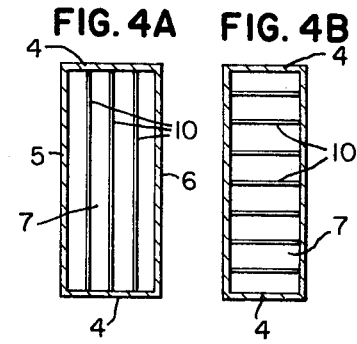
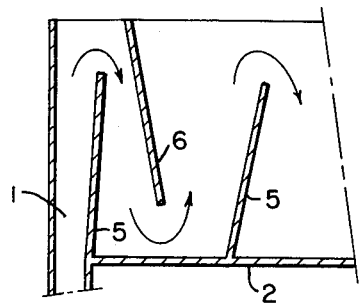
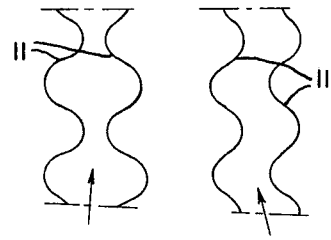
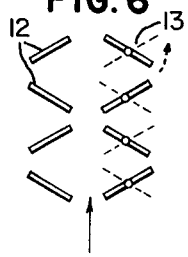

APPARATUS FOR BRINGING ABOUT PARTICLE GROWTH IN A FLOWING LIQUID SUSPENSION

This application is a continuation of U.S. patent application Ser. No. 559,132, filed Mar. 17, 1975, and now abandoned, which was a continuation of U.S. patent application Ser. No. 353,543, filed Apr. 23, 1973, and now abandoned.

When a liquid in which separate particles are suspended remains stagnant for some time, it appears that, apart from separation (either sedimentation or flotation), also particle growth occurs. This is a consequence of the fact that, when some difference in the natural separation velocity exists between particles, for instance as a consequence of different dimensions, there is a certain probability that two particles overtake one another and will combine with each other.

In laboratory apparatus it is known that such a particle growth can be accelerated by stirring, so that, then, the residence time in a vessel for obtaining separation can be reduced. This is caused by the introduction of velocity differences between different parts of the liquid increasing the overtaking probability. Accordingly as the particle dimensions are increasing, the stirring velocity should be reduced so as to prevent the growth from being annihilated by the shearing effect between liquid layers. As the velocity gradient is mainly present in the immediate vicinity of the stirrer, stirring has, in the long run, no or little effect.

For handling large quantities of the liquids stirring is not suitable. For that purpose devices are known, however, comprising a number of parallel baffles arranged in a staggered fashion imparting abrupt direction changes to the liquid passed through said device, in which, as a consequence of centrifugal forces, particle growth caused by velocity differences will occur. For obtaining a sufficient effect, however, the dimensions of such a device and the residence times of the liquid in the device should be considerable.

The invention provides apparatus for treating large quantities of a liquid suspension in a continuous flow as a preparation for an efficient separation of the suspended components in a suitable separation device. The considerable particle growth obtained according to the invention will lead to a substantially increased separation at the same capacity, so that the efficiency of the separation device is increased, and the dimensions of a separation system from which this separation device is a part may be reduced and its yield may be increased.

In accordance with the present invention, the liquid is caused to flow in a vertical direction, while the average flow rate during the whole treatment is maintained at such a value that substantially all the particles are dragged along in the flow. The residence time in this vertical flow is such that particle growth by coalescence, as a consequence of differences in velocity of the particles in the liquid flow, is obtained so as to promote the desired separation in a subsequent stage.

In particular the vertical flow may be divided into a number of successive flows with alternating flow sense. The flow velocity and residence time suitable for the particle growth may be adjusted by a suitable selection of the cross-section of these partial flows. Furthermore, the flow velocity may be adapted to the input flow velocity desired in the subsequent separation device. The natural velocity gradient between the center of the flow and the flow parts near the boundary walls can be increased by using plates dividing said flow in parallel partial flows. The plates may be provided, if desired, with corrugations or similar profiles, and may be, for instance, mutually slidable so that the flow distribution may be influenced at will.

The invention provides, furthermore, a device for performing this method, which device may be realized in various manners so as to be adapted to different requirements.

Figure 8:
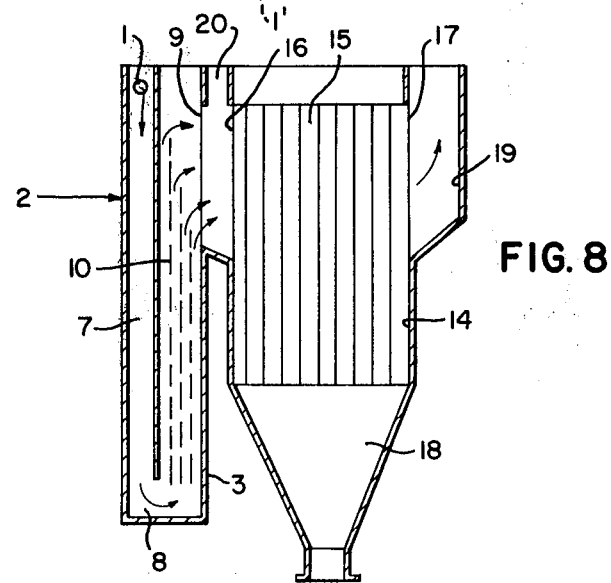

The invention will be elucidated below by reference to a drawing, showing in:

FIG. 1, a simplified diagrammatical representation of a device according to the invention;

FIGS. 2 and 3, highly simplified cross-sections of other embodiments of the invention;

FIGS. 4a and 4b, respectively, views from below of a chamber of such a device with different arrangements of auxiliary plates; in FIG. 4c, a diagrammatical cross-section of a number of such plates with different lengths;

FIGS. 5a and 5b, longitudinal sections of special auxiliary plates in two different positions;

FIG. 6, a diagrammatical representation of adjustable strips replacing the plates of FIG. 5; and FIGS. 7 and 8, respectively, a diagrammatical representation in perspective, and a cross-section of a device according to the invention, connected to a separation device.

As mentioned above the invention is based on the insight that particle growth will occur when suspended particles are allowed to overtake one another. This will occur, in particular, in a vertical liquid column as a consequence of differences in the sedimentation or flotation velocity, irrespective of the fact whether this column is stationary or moving in the vertical direction. In a moving column the flow velocity near the boundary walls will, moreover, be smaller than in the center of the flow on account of the friction. As a result of the velocity gradient, velocity differences will develop between adjacent liquid layers, increasing the probability of collision between the particles. While, for the initial particle growth large velocity differences are favorable, a limit will be reached. This results from fact that the gradual growth, as the shearing action between adjacent flow layers with different velocities will lead to disintegration of the coalesced particles. In order to continue to obtain a gradual growth, such velocity differences should be decreased, but then the collision probability will also decrease so that it takes a longer time before the same rate of increase of particle dimension is obtained as with the preceding steeper velocity gradient.

On the other hand the flow velocity is limited by the requirement that the dragging velocity should be higher than the natural separation (sedimentation or flotation) velocity when the flow is opposite to this velocity. The residence time in such a flow is, furthermore, limited by the dimensions of the flow passage, which, in turn, are related to the desired velocity gradient, and by the desired flow volume per unit of time. Therefore it is, generally, not usually possible to obtain, in a passage with reasonable dimensions, a particle growth which is sufficient for a substantial improvement of a subsequent separation in a separation device.

In FIG. 1 a device according to the invention is shown in general form, which is based on the preceding considerations. By means of a supply duct 1 the suspension to be treated is supplied at a given pressure, namely the static pressure of a liquid container situated at a higher level or the pressure provided by a supply pump. The velocity of the liquid in the duct 1 is made sufficiently high for counteracting separation of suspended particles therein.

The device shown comprises a tank 2 with terminal walls 3 and lateral walls 4. In this tank partitions 5 are provided parallel to the terminal walls 3, which join the bottom of this vessel and terminate at some distance from the upper edge, and between these partitions 5 other partitions 6 are provided which extend above the normal liquid level in the tank 2 and terminate at their lower end at some distance from the bottom of the tank 2. In this manner successive chambers 7 are obtained which are interconnected by connections 8 either above the partitions 5 or below the partitions 6. The duct 1 communicates with the first chamber 7 at the lower side thereof, and in the terminal wall 3 bordering the last chamber a discharge opening 9 is provided, communicating with the supply opening of a separating device for separating the suspended particles.

In the odd chambers the liquid flows upwardly, and in the even chambers it flows downwardly. Provisions should be made for ensuring that the upward velocity in the odd chambers is higher than the natural sedimentation velocity of sedimentating components, and/or the downward velocity in the even chambers is higher than the natural flotation velocity of buoyant components, as the case may be, and the flow in the connections 8 should be such as to counteract separation in these parts.

The cross-section of the first chamber 7 is selected so as to reduce the velocity of the liquid leaving the duct 1 sufficiently for obtaining a certain residence time in this chamber, and, on the other hand, the bordering walls of this chamber produce such a velocity gradient that particle growth will be initiated to a considerable extent. Moreover this chamber provides for adapting the flow leaving the relatively narrow duct 1 to the larger width of the tank 2.

In order to obtain a steeper velocity gradient without considerably reducing the cross-section, which would have an unfavorable influence on the residence time, the distance between the first partition 5 and the wall 3 is small relative to the width of the wall 3, so that the velocity gradient is mainly determined by the partition 5 and the wall 3, and, nevertheless, a sufficient cross-section is obtained.

The distances between the partitions 5 and 6 in the successive chambers generally increase so as to obtain a decrease of the velocity gradient in these chambers, in order to counteract, in the manner, tha annilhilation of growth by shearing action. This involves an increase of the cross-section and, therefore, of the residence time, which is favorable for maintaining a gradual particle growth. Moreover the average flow velocity in each successive chamber 7 decreases. These decreases may be chosen so that the velocity near the discharge opening 9 is substantially equal to the desired supply velocity in the separation device communicating with the tank 2. Such a separation device is, for instance, a plate separator with corrugated plates, although not shown in FIG. 1.

The position of the opening 9 is, as such, arbitrary, and this opening may, for instance, also be situated near the bottom of vessel 2 when this would be more favorable for the connection with the separation device. Also, the position of the supply duct 1 may be changed at will.

When, as shown in FIG. 2, the partitions 5 and 6 are oriented obliquely, a gradual reduction of the velocity and of the velocity gradient is obtained. FIG. 3 shows an embodiment with coaxial partitions 5 and 6 enabling one to obtain an operation which corresponds to the operation of the device of FIG. 1. When the coaxial partitions are frustroconically shaped, an operation as in FIG. 2 is obtained.

The velocity gradient may be increased, while preserving the velocity distribution in the successive chambers 7 and the average velocity in each chamber, by sub-dividing the chambers by means of auxiliary plates into partial chambers in parallel connection, so that, while preserving the flow cross-section in a chamber, the wall distance is reduced and, thus, the velocity gradient is increased.

As shown in FIG. 4A, auxiliary plates 10 may be arranged parallel to the terminal wall 3, and, therefore, to the partitions 5 and 6. FIG. 4B shows similar plates 10 which extend parallel to the side walls 4. If the auxiliary plates are employed with structure such as that shown in FIG. 2, either fan-like diverging plates or parallel triangular plates adapted to the chamber shape may be used. On the other hand, when they are employed with structure as shown in FIG. 3, the plates may be cylindrical or may be situated in planes extending through the axis of the assembly.

The plates 10 will generally extend for the total height of the chamber 7 in question, and provisions should be made to ensure that the liquid flow in the adjacent connection 8 is not obstructed. In the arrangement of FIG. 4B, these plates may also extend into the connections 8, and, there, join corresponding plates in the adjacent chamber 7. It is, however, also possible to provide the plates in only a part of the chamber 7. It is also possible, in the manner shown in FIG. 4C, to make some of the plates shorter than the remaining plates, so that a decrease of the wall effect provided by these plates is already obtained within the chamber itself. It is also possible to make a part of the plates slidable in order to allow a certain control to be obtained, as will now be described.

Another method for introducing velocity differences into the flow is shown in FIG. 5. Therein use is made of corrugated plates 11 having their corrugations directed transversely to the flow direction, the latter being indicated by an arrow in FIG. 5. In FIG. 5A, the corrugations of two adjacent plates are in phase opposition so that the intermediate passages have alternating narrowing and widening parts. Consequently not only transverse but also longitudinal velocity differences are generated, providing an additional promotion of growth. When one of the plates 11 is shifted by half a wave length the situation of FIG. 5B, i.e. phase coordination, is obtained. In that case the width of the passages is the same everywhere, so that mainly the same effect as with flat plates is obtained, but the path length is increased. The repeated changes of direction, however, will also, in the latter case, lead to additional velocity differences, so that in the situation of FIG. 5B, the growth effect will be larger than in the case of flat plates.

Such corrugated plates may, again, be arranged in the manner of either FIG. 4A or FIG. 4B. The flow in the outer passages bordered by one corrugated plate and a plane wall is different from the flow between two corrugated plates 11. In the arrangement of FIG. 4B, the influence of the outer passages is, on the whole, much smaller. By a suitable choice of the distance to the flat wall or of the width of the outer corrugated plates, it is possible to arrange that the effect of the outer passages does not deviate too much from the average effect of the remaining passages.

It is also possible to provide the walls in question with corresponding corrugations, and it is also possible to provide corrugated and flat plates alternately. In the latter case the control effect according to FIG. 5 is no longer possible, but, then, the control effect referred to with respect to FIG. 4C is still possible.

The provision of corrugated plates leads to an increase of the flow resistance of the chamber in question, and, moreover, the resistance in the case of FIG. 5A type structure will be higher than that of FIG. 5B. The flow resistance appears from the difference in the liquid level of successive chambers. This level difference is a measure for the power absorbed for overcoming resistance. From the equations for the liquid flow in a restricted passage the following relationship may be deduced:

$$Y \simeq \sqrt{\frac{P}{\eta \cdot V}}$$

in which Y is the average velocity gradient transversely to the flow direction, P is the supplied power, $\eta$ is the viscosity, and V is the volume of the liquid. From this follows, when $\Delta h$ is the level difference:

$$P \propto (\Delta h)^2,$$

and, therefore, $Y \propto \Delta h$.

When, for instance by experiments, a suitable value of Y has been determined, the latter can be adjusted by shifting the plates in the manner shown in FIG. 5 such that $\Delta h$ obtains the corresponding value. This can, of course, also be obtained automatically, in particular when it is desired to maintain a given velocity gradient.

The reduction of the resistance, in particular by removing plates, may be used, moreover, in order to obtain a strong liquid flow for flushing the device.

In the case of a chamber which is subdivided by a rather small number of corrugated plates, an increase of the resistance of the inner passages by shifting the corrugated plates will cause the flow through the outer passages to be increased. Therefore in the outer passages an increase of the velocity gradient will take place, although the residence time will be shorter. On the other hand, a reduction of the resistance in the inner passages will cause the flow through the outer passages to be reduced, so that the velocity gradient is reduced but the residence time is increased. This more or less antagonistic effect in the inner and outer passages has the consequence that load fluctuations are smoothed out to a certain extent. This is an advantage of this simple structure.

If desired instead of corrugated plates, plates with another profile may be used, e.g., a triangular or trapezoidal profile, or plates with transverse ribs or the like.

FIG. 6 shows another solution, in which strips 12 are used, arranged in parallel rows, and at least the strips in alternating rows can be rotated on longitudinal axes 13, as indicated by dashed lines. In this manner the effects of FIGS. 5A and 5B can be imitated. Moreover the passages are, then, interconnected so that load differences will be balanced. This is also possible by providing apertures in the plates 10 or 11.

It is also possible to arrange the plates of FIG. 5 in such a manner that the corrugations extend in the flow direction. In that case no velocity differences in the flow direction will be obtained.

In practice the first chamber 7 of the device of FIG. 1 will be used for uniformly introducing and distributing, in the lateral direction, the liquid flow emerging from the duct 1. This chamber may, for instance, be provided with one corrugated plate parallel to the terminal wall 3 and the adjacent partition 5. The subsequent chambers may, for instance, be provided with corrugated plates in the arrangement of FIG. 4 or 5, which may be made adjustable. The last chamber 7 may, for instance, not be provided with corrugated plates, and it can have a smaller cross-section than the preceding chamber 7. Thus, in the last chamber only the effect of the bordering walls is used. It may, however, be preferred to provide, in the last chamber 7, guiding baffles effecting a uniform transition towards the discharge 9.

Moreover, it may be favorable to combine assemblies of partitions and plates into separate units, for instance, made of plastics, and positioned in a strong metal tank 2. In this manner, assembling such a device is simplified, and, moreover, such units can be easily removed from the tank for cleaning and repair, and can, if necessary, be replaced by other units.

In the preceding description it is assumed that the liquid is supplied to the first chamber from below, but it is also possible to supply the liquid from above. This will, for instance, depend on the number of chambers and on whether the circumstances allow the supply duct to be mounted in the manner shown in FIG. 1.

FIGS. 7 and 8 show a combination of a plate separator and a simple embodiment of the device of the invention. The separator comprises a tank 14 in which a number of parallel corrugated plates 15 are mounted at a slope relative to a vertical plane the corresponding crests and valleys of said plates lying in substantially vertical planes, as described in the copending U.S. patent application Ser. No. 112,620 (1971). This tank has, in one side wall, a supply opening 16, and in the opposite side wall a discharge opening 17, so as to obtain a mainly horizontal liquid flow in the passages between the plates 15. At their lower ends the passages between the plates 15 communicate with a collecting funnel 18 to collect the sediment sliding downwardly in the valleys of the plates 15 after being separated from the liquid flow in said passages. Buoyant components of the liquid will be collected in the crests of these plates, and move upwardly, and can be removed at the upper end of the plates 15 in a suitable manner. The opening 17 communicates with a discharge chamber 19 for the carrier liquid.

The device of the invention comprises, in the embodiment shown, only two chambers 7. The supply duct 1 opens, at the upper side, in the first chamber, and the discharge opening 9 of the second and last chamber communicates with a connecting chamber 20 which, in turn, communicates with the supply opening 16 of the plate separator 14. In the second chamber 7, plates 10 are indicated by dotted lines. The upper ends of these plates are staggered in the vertical direction so as to obtain a uniform distribution of the liquid over the cross-section of the opening 9.

In the connecting chamber 20, flow guiding means may be inserted for improving the uniformity of the flow distribution. These guiding means may, for instance, consist of transverse strips or louvers, which may be adjustable if desired, or may be a spatial grid consisting of mutually crossing bars. Preferably such guiding means are constructed as a separate unit which may be removably inserted in guides on the walls of the connecting chamber. As shown, the bottom of the connecting chamber 20 has a downward slope so as to guide sediment already separated in tank 2 and chamber 20 towards the collecting funnel 18. Also, the discharge chamber 19 has such a sloping bottom for the same purpose.

Of course, any number of chambers 7 may be chosen, and plates 10 may be provided in the first chamber 7, if desired. In some cases, one chamber may be sufficient, and then the supply duct 1 will be connected to the lower end as indicated at 1'.

It will be clear that many modifications are possible within the scope of the invention. A device according to the invention can, for instance, be connected in series with a similar device when the effect of one such device is insufficient and the construction of a special device with an accordingly larger number of chambers is not economical.

I claim:

1. Apparatus for separating suspended particles from a flowing carrier fluid, comprising in combination:

a coalescence device including a vessel having a supply duct connected to a source of particle-bearing flowing fluid, having a discharge opening through which the particle-bearing fluid emerges from said vessel, and having at least one stationary plate attached to the inside of said vessel intermediate said supply duct and said discharge opening defining in association with said vessel a velocity gradient generating fluid passage in which the direction of fluid flow is reversed at least once, said passage comprising at least two vertically-elongated chambers in serial communication, each chamber being defined by generally vertically-extending surfaces including a pair of opposite walls disposed in a preselected spaced-apart relationship so that predetermined velocity gradients are generated in the fluid flowing through each of said chambers due to frictional contact with the walls of said chambers, said predetermined velocity gradients having a predetermined magnitude sufficiently large to promote coalescence of the particles but not so large as to cause disintegration of the coalesced particles; and, a separator device including a separator vessel having a supply opening connected with the discharge opening of said coalescence device and receiving flowing fluid from it, having a plurality of spaced-apart substantially parallel plates positioned within it, said plates mounted at a slope relative to a vertical plane and defining a plurality of parallel passages through which the fluid flows, the space between the plates being sufficiently small to cause the coalesced particles to separate from the flowing carrier fluid and to be deposited on said plates, said separator vessel having a discharge opening through which the flowing carrier fluid is discharged.

2. The apparatus of claim 1 wherein the spacing between said opposite wall of each chamber of said coalescence device is successively greater in the successive chambers through which the flowing fluid passes.

3. The apparatus of claim 1 wherein said coalescence device further comprises at least one friction-producing flow-guiding plate mounted within one of said chambers parallel to but spaced from said stationary plates and dividing the chamber into parallel flow channels, said at least one flow-guiding plate having upstream and downstream ends which terminate a predetermined distance from said vessel.

4. The apparatus of claim 3 wherein the number of said friction-producing flow-guiding plates is decreased in successive chambers through which the flowing fluid passes.

5. The apparatus of claim 3 wherein at least two friction-producing flow-guiding plates are mounted within a chamber in a substantially parallel spaced relationship, and wherein said friction-producing flow-guiding plates are corrugated in a common direction transverse the direction of fluid flow.

6. The apparatus of claim 4 wherein the corrugations of two adjacent flow-guiding plates are in a predetermined phase relationship along the direction of fluid flow.

7. The apparatus of claim 1 wherein said plates of said separator device are corrugated plates whose corrugations extend in the direction of greatest slope.

8. The apparatus of claim 1 further comprising a discharge chamber connected to said discharge opening of said separator vessel and receiving the discharge of flowing carrier fluid from it.

9. The apparatus of claim 1 wherein said separator device further comprises a collecting funnel attached to said separator vessel at the bottom thereof.

* * * * *